Aug. 11, 1964   G. BANKO   3,143,831
OPTICAL VIEWER AND GRINDING WHEEL DRESSER
Filed Nov. 24, 1961   8 Sheets-Sheet 7

INVENTOR.
GEORGE BANKO
BY
Sanford Schnurmacher
ATTORNEY.

Aug. 11, 1964   G. BANKO   3,143,831
OPTICAL VIEWER AND GRINDING WHEEL DRESSER
Filed Nov. 24, 1961   8 Sheets-Sheet 8

Fig. 11

INVENTOR.
GEORGE BANKO
BY
ATTORNEY.

United States Patent Office 3,143,831
Patented Aug. 11, 1964

3,143,831
OPTICAL VIEWER AND GRINDING WHEEL DRESSER
George Banko, 1834 E. 223rd St., Euclid, Ohio
Filed Nov. 24, 1961, Ser. No. 154,411
2 Claims. (Cl. 51—165)

This invention relates to optical projection viewers and particularly to an optical viewer in combination with a cylindrical grinding machine having a light source which provides a beam of light critically collimated in a single vertical plane and including a grinding wheel dresser whose cutting diamond is illuminated by said light beam.

Conducive to a better understanding of this invention it may be well to point out that one of the major shortcomings of all optical viewers, including comparators, is that it is impossible to obtain a sharp image of a straight sided edge of a work-piece, at the magnifications (10× and over) necessary for the precision requirements of the finished product.

This is due to the fact that with the large light source heretofore necessary for adequate illumination of the work-piece, a penumbra, or secondary shadow is cast, where the light source is partly but not wholly cut off by the intervening work-piece, causing an area of partial illumination between the umbra, or perfect shadow, and the full light.

This blurring of the edge of a shadow has nothing to do with slight departure from rectilinear propagation, but is due to the extent of the source.

As a result of the presence of the penumbra, the true edge of the work-piece shadow cannot be accurately perceived, but must be estimated on the basis of the previous experience of the operator.

Again, due to the presence of the penumbra, the angle and path of travel of the diamond cutter of a grinding wheel dressing tool cannot be optically set by projecting the shadow image of its cutting edge against the viewing screen template outline, to which the work-piece is being ground. Instead, the dressing tool cutter must be set mechanically, which is a time-consuming process in situations wherein the grind wheel must be given a complex shape.

It is of course common knowledge that a point source of light will cast a sharp shadow but heretofore no way has been found to obtain a point source of light that would provide adequate illumination for an enlarged work-piece image of appreciable size.

The primary object of this invention, therefore, is to provide an optical viewer for an operating, cylindrical grinding machine, whose work-piece, umbra, or shadow image on the viewing screen is free of penumbra.

Another object of the invention is to provide an optical viewer of the type stated whose work-piece illuminating source provides a beam of critically collimated light in a single vertical plane, whereby a penumbra free image of all the straight sided edges of the work-piece is formed on the viewing screen.

A further object is to provide a device of the type stated having a grinding wheel dressing tool that is illuminated by the same critically collimated light beam that is used to illuminate the work-piece so that it can be optically set to the proper wheel shaping angle.

Still another object is to provide an optical viewer for a grinding machine, including a wheel dresser tool journaled about the optical axis of the viewer's objective lens system with the optical axis running through the tool support and along the cutting edge of the tool.

These and other objects of the invention will become apparent from a reading of the following specification and claims, together with the accompanying drawings wherein like parts are referred to and indicated by like reference numerals, and wherein:

Figure 1:
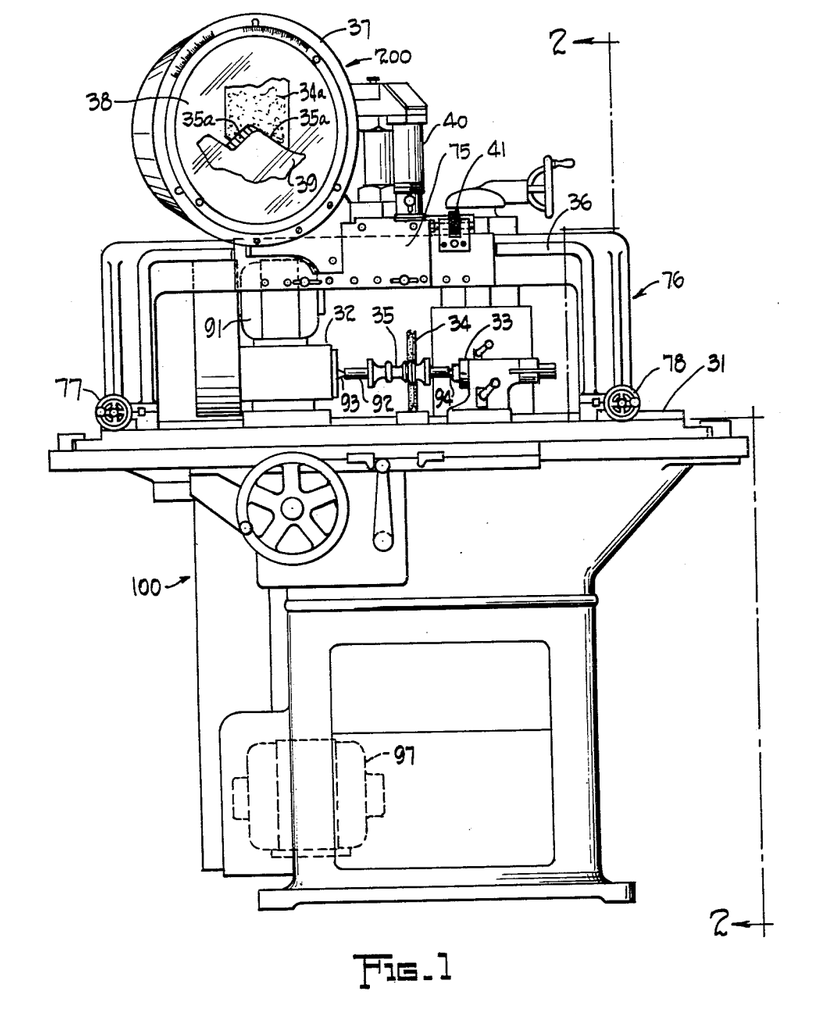
FIGURE 1 is a front elevation of a conventional cylindrical grinding machine tool showing the optical viewer that is the subject of this invention mounted thereon.
Figure 2:
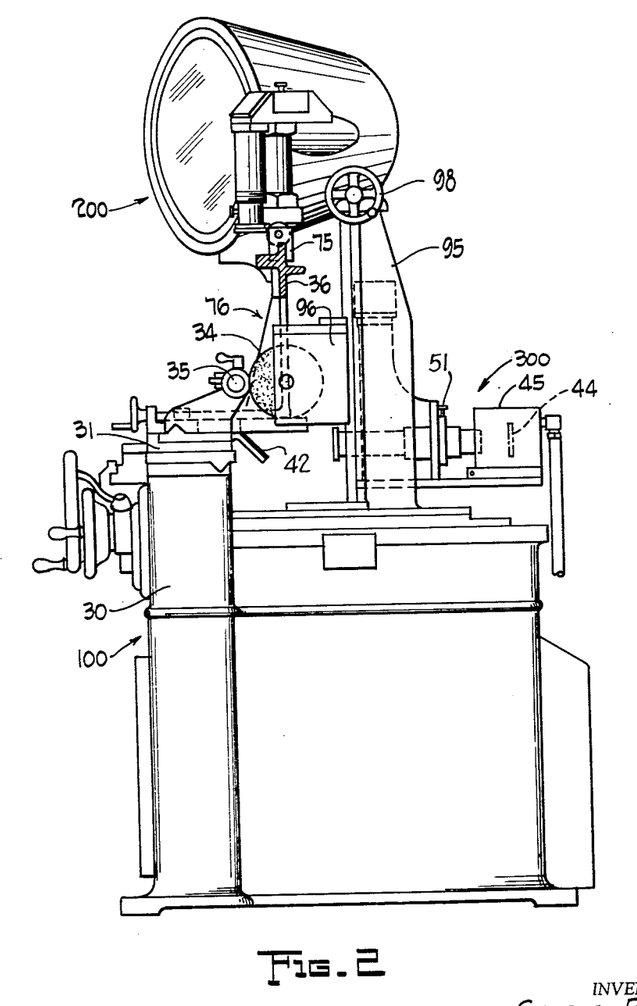
FIGURE 2 is a right end view of the same with portions broken away and in section, taken along the line and in the direction of arrows 2—2 of FIGURE 1.
Figure 3:
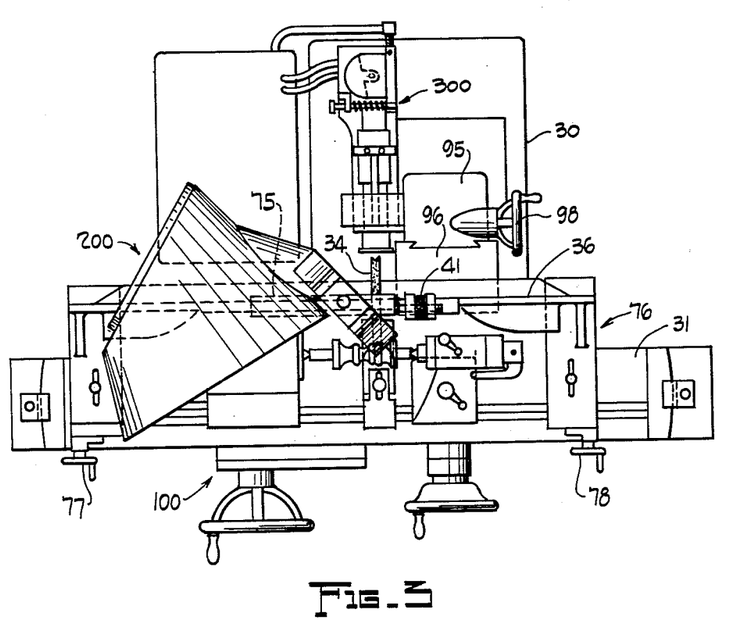
FIGURE 3 is a top plan view of the same.

Referring more particularly to the drawings, the instant invention consists of the combination of an operational cylindrical grinding machine, broadly indicated by reference numeral 100, with an optical viewer, broadly indicated by reference numeral 200 mounted on the table 31 thereof, as seen in FIGURES 1 and 2.

The structure indicated by reference numeral 100, used for the purpose of illustration in FIGURES 1 and 2, is a conventional cylindrical grinding machine having a base 30 and a table 31 mounted for longitudinal and cross-wise movement thereon.

Reference numerals 32 and 33 indicate head and foot stocks, respectively, mounted on table 31. The headstock spindle is driven by a motor 91. The work-piece 35, to be shaped, is mounted on an arbor 92, held between centers 93 and 94.

Reference numeral 95 indicates the upright post which carries the vertically movable slide 96 on which the grinding wheel 34 is mounted.

Both grinding wheel 34 and the table 31 are driven by the motor 97 through suitably arranged belts and gearing, as is well known by those skilled in the art.

The grinding wheel slide 96 is adjustably vertically of the post 95 by means of hand wheel 98.

The viewer 200 is supported on a substantially U-shaped frame 76 mounted on the table 31.

The frame 76 has a central horizontal rail portion 36, extending above and clear of the area between the head and post stock centers 93 and 94, and the working face of the grinding wheel 34.

The entire frame 76 can be locked in adjusted positions longitudinally of the table 31 by means of T-slot bolts. Reference numerals 77 and 78 indicate hand wheels at the base of each leg of the frame 76 which control cross-feed mechanism whereby the entire frame can be moved laterally of table 31.

Figure 4:
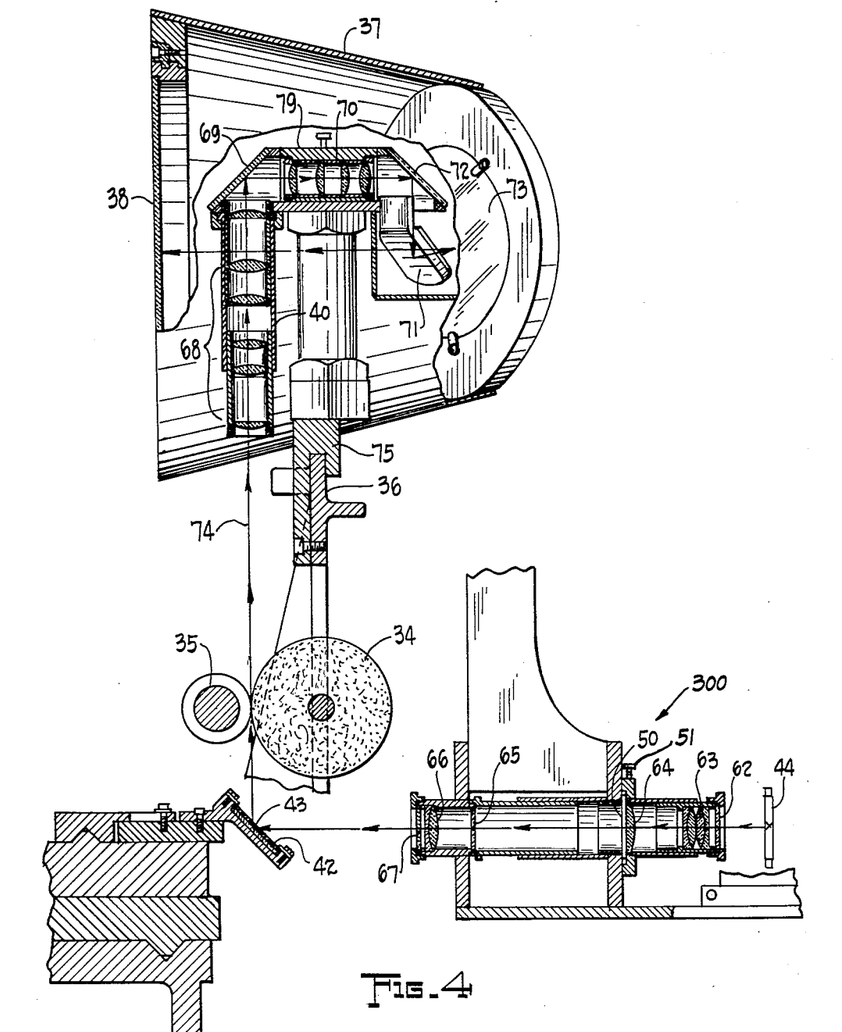
FIGURE 4 is a vertical, sectional view taken substantially along the optical axis of the viewer.

Reference numeral 75 indicates the optical system bracket locator shoe which is slidably mounted on the frame rail 36, as is most clearly seen in FIGURES 1, 2 and 4.

The shoe 75 can be moved longitudinally of the rail 36 to bring the optical system into accurate alignment with the cutting area of the wheel 34, by means of the fine-adjustment screw 41.

Reference numeral 37 indicates a light tight housing mounted on the shoe 75, having a viewing screen 38 mounted in its front face and so positioned as to be conveniently viewed by a person standing in front of the machine.

A vertical and dependent objective lens tube 40 contains an objective lens system 68 made up of suitable components to provide the required magnification.

The upper end of tube 40 is connected to a projector housing 79, having a projector lens system 70, a mirror 69 reflecting the image from objective lens 68 to projector lens 70. Mirrors 72 and 71 reflect the image to mirror 73 in the viewer housing or case 37, which in turn reflects the shadow image to the translucent viewing screen 38. The resultant image is properly erect and properly positioned from left to right with reference to the work-piece.

A mirror 42, having a protective, replaceable abrasion resistant plastic cover 43, is mounted on the optical axis 74 of the viewing system below the point of contact of the work-piece 35 and the grinding wheel 34, as is seen most clearly in FIGURE 4.

Reference numeral 300, broadly indicates a source of critically collimated light which projects a beam of light, collimated in a vertical plane, against the mirror 42. The light source assembly comprising a vertically mounted elongated high intensity mercury lamp 44, a collimating lens 66 and a vertical slit 50 positioned between the lamp 44 and the collimator lens 66 at the principal focus of the lens 66 so that light waves from the slit are plane after refraction by the lens 66.

Figure 5:
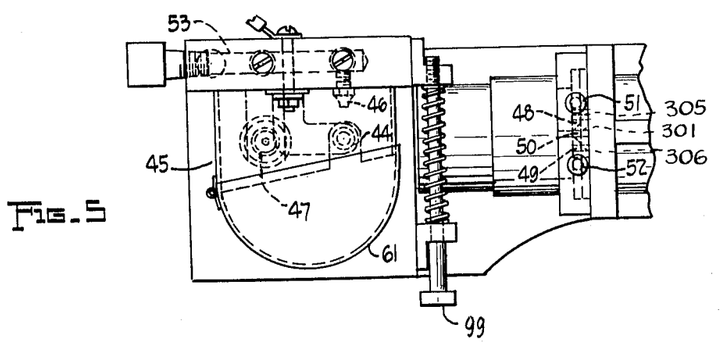
FIGURE 5 is a top plan view of the light source housing.
Figure 6:
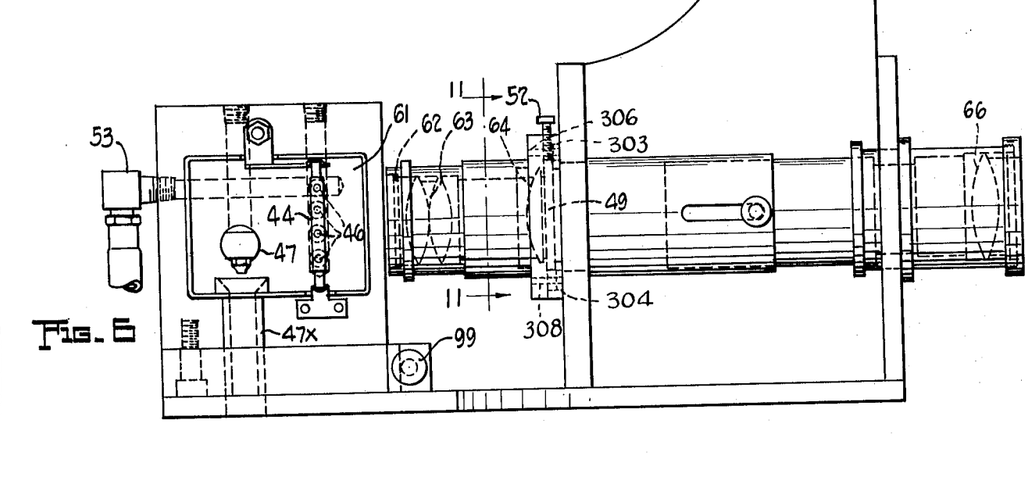
FIGURE 6 is a side elevation of the same.
Figure 7:
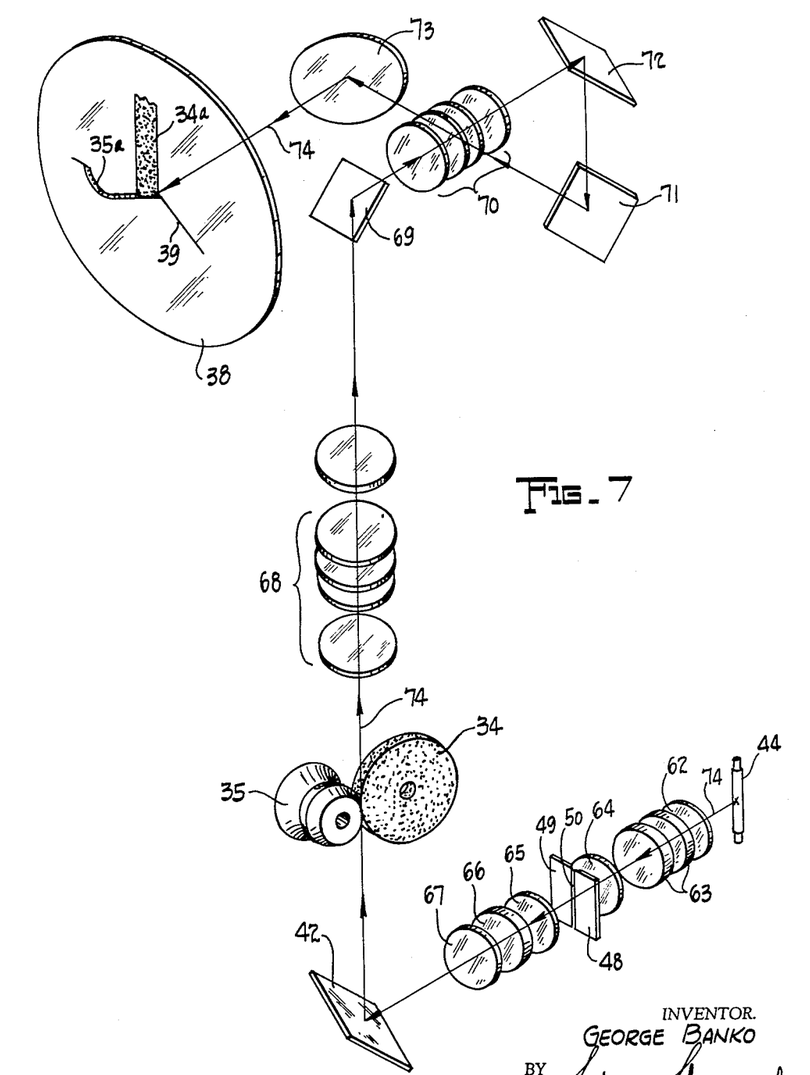
FIGURE 7 is a schematic layout of the optical system.
Figure 8:
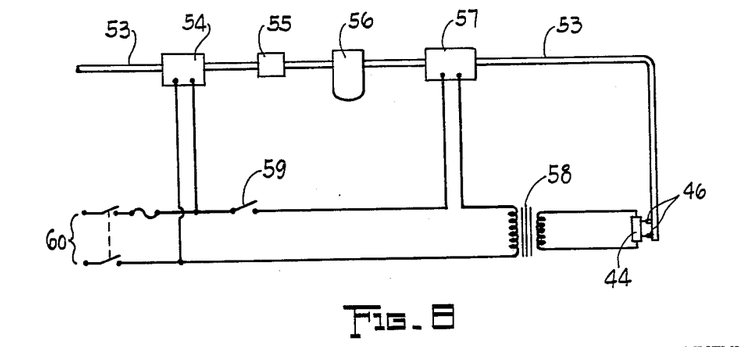
FIGURE 8 is a schematic layout of the electric and cooling systems associated with the light source mercury lamp.

Referring to FIGURES 5, 6 and 8, details of the lamp 44 and its associated power and cooling system are shown.

The lamp 44 is mounted in a light tight metal case having a door 61 which operates an inter-lock safety switch 59 in the primary circuit 60 of the lamp power transformer 58 to cut off the power when the door is opened. The lamp 44 comprises a narrow, tubular, high intensity mercury lamp, and in the preferred form illustrated is known as a Model BH–6 Lamp, manufactured by The General Electric Co., of Schenectady, New York.

This lamp has a very high operating temperature and therefore requires a very efficient cooling system, since it is operated within a small, fully enclosed, light tight case.

Referring to FIGURE 8, the cooling system comprises a compressed air line 53; a solenoid air valve 54 which opens when the lamp circuit is closed; a pressure reducer valve 55 which reduces the line pressure to 20 p.s.i.; a filter 56 for the removal of water and oil; a pressure operated switch 57, which requires a line pressure of 15 p.s.i. to close, so that the lamp cannot be activated until the line pressure is adequate; and a plurality of air jets 46, aligned the length of the lamp 44, which impinge cooling air directly against the lamp. Since a large volume of air is released in the relatively small area of the closed case, an air syphon, or aspirator 47, is provided which acts to evacuate the hot air from the case through exhaust pipe 47x.

Two opaque blades 48 and 49, spaced apart a small distance to provide a vertical slit 50 therebetween, are positioned parallel to the vertical plane of the lamp 44, as is seen most clearly in FIGURE 5.

The opposed edges of the blades 48 and 49 are tapered away from the blade surface faced toward the lamp so that the slit 50 has two razor thin, parallel, straight edges faced toward the lamp. The blades may be moved toward or away from each other by means of adjusting screws 51 and 52, to vary the width of the slit 50 between 0″–.030″.

Figure 11:
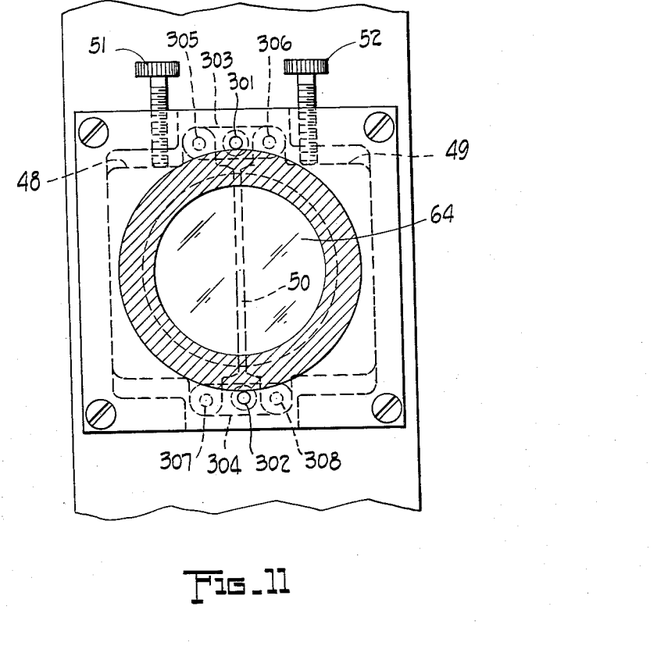
FIGURE 11 is a view of the collimating slit, taken along the line and in the direction of the arrows 11—11 of FIGURE 6.

As is seen most clearly in FIGURE 11, the opaque blades 48 and 49 are mounted for independent vertical movement, and are connected together at their upper and lower adjacent edges through pivot links 303 and 304, which are pivoted at their center points on bearings 301 and 302, respectively.

The outer ends of link 303 are pivotally connected to the upper edges of blades 48 and 49 through pivot bearings 305 and 306, respectively.

The outer ends of link 304 are pivotally connected to the lower edges of blades 48 and 49 through pivot bearings 307 and 308, respectively.

A study of FIGURE 11 will show that the two blades 48 and 49 may be moved toward or away from each other, in opposite vertical directions, to vary the width of the slit 50, by proper manipulation of the adjusting screws 51 and 52.

For example: If screw 51 is rotated upward and away from blade 48, leaving a space therebetween, and adjustment screw 52 is moved downward against the blade 49, the downward movement of blade 49 acting through pivot links 303 and 304 will cause blade 48 to move upward. At the same time the pivoting of the links 303 and 304 on their center bearings 301 and 302 will move the blades toward each other to narrow the width of the slit 50. After the desired slit width is achieved by rotating the screw 52, screw 51 is brought down into contact with blade 48, which clamps the blades in this position against further movement.

As illustrated in FIGURE 11, the blades 48 and 49 are set at their intermediate position, in which the slit is at its widest point. Movement in either direction will narrow the slit 50.

The mechanism just described is a preferred way of mechanically varying the width of the slit 50, but it is to be understood that there may be other ways of achieving the same result.

Reference numeral 63 indicates a condenser lens, protected by a heat absorbing plate 62, positioned between the slit 50 and lamp 44.

A plane-convex lens 64 is positioned about 1/16″ from the slit 50 with its plane side faced toward the slit.

A collimating lens 66 is positioned outwardly from the slit 50 at a point whereat the slit 50 is at the principal focal point of the lens 66. Reference numerals 65 and 67 indicate yellow filter and lens protecting plates, respectively.

To put the viewer in operation, the optical axis 74 of the objective lens 68 is aligned with the point of contact between the workpiece 35 and the grinding wheel 34.

The mirror 42 is then aligned with the optical axis 74 below the work-piece and in line with the lamp system 44 so that light from the lamp will be reflected upward along the axis 74.

After the lamp is lit, it is aligned with the slit 50 by means of screw 99 which causes the lamp to move crosswise of the vertical center-line of the slit ±¼″.

The slit is adjusted by means of screws 51 and 52 to the point at which the beam is critically collimated in a single vertical plane. This usually occurs when the slit is approximately .011″ wide.

"Critically collimated," as used in this specification, means that the width of the slit is just short of that at which the light passed therethrough to the collimating lens 66 creates diffraction lines to appear on the viewing screen 38.

At that setting, the slit 50 acts the same as a point light source which produces a sharp shadow image 35a of a straight sided edge such as that of the work-piece 35, free of penumbra, or secondary shadow.

This is especially desirable where the image is magnified 10 or more times, since the absence of a penumbra provides a true, sharp, shadow image of the work-piece edge 35a relative to the template guide line 39 drawn on the screen 38, as seen in FIGURE 1.

With the conventional light beam source, used heretofore, a sharp shadow image of a straight edge could not be obtained on the viewing screen, making it necessary for the operator to estimate where the true umbra edge was.

Figure 9:
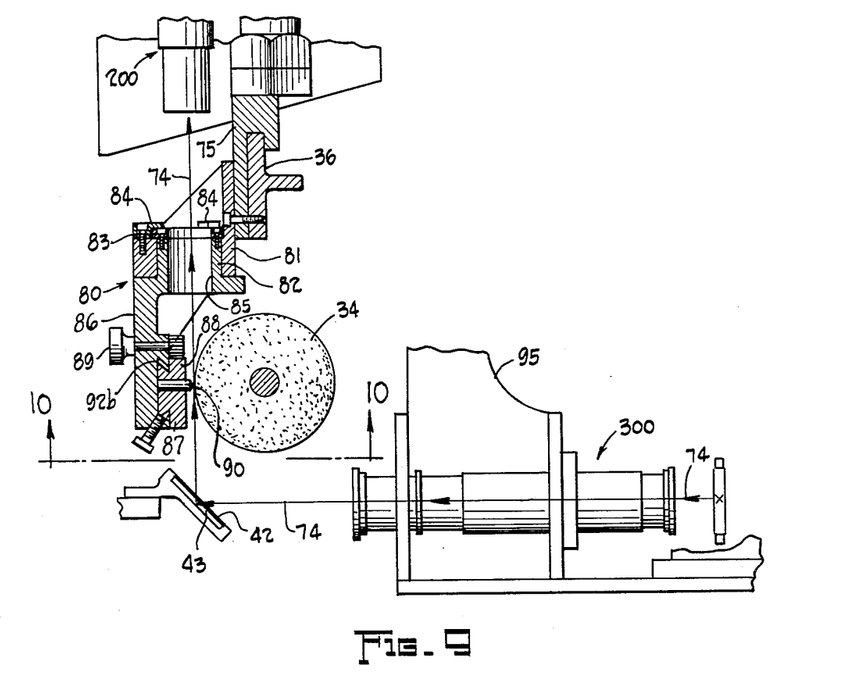
FIGURE 9 is a vertical sectional view through the wheel dressing tool as it appears mounted on the optical axis of the viewer.
Figure 10:
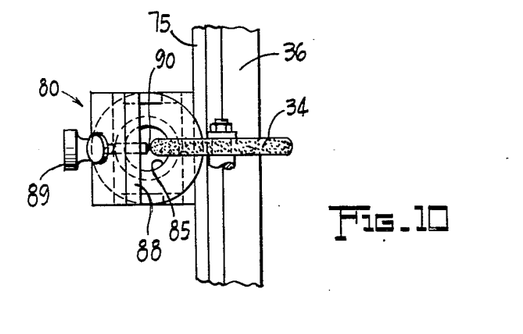
FIGURE 10 is a top plan view of the same.

Referring to FIGURES 9 and 10, there is seen the optical viewer grinding wheel dresser, broadly indicated by reference numeral 80.

The wheel dresser comprises a hollow bracket 81 mounted on the housing shoe 75.

A hollow bearing sleeve 82, including a supporting collar 83, is mounted through and rotatable in the bracket 81.

Reference numeral 86 indicates a dependent arm supported by the sleeve 82 and having a cross-slide 87 mounted on the lower end thereof. The cross-slide 87 has a rack 88 engaged by a pinion control handle 89.

A cutting diamond 90 is mounted on the cross-slide 87.

The wheel dresser 80 is so positioned on the shoe 75 that the optical axis 74 is centered in the bore 85 of the rotatable sleeve 82, as seen in FIGURE 9. The supported slide and diamond can thus be rotated about the optical axis 74 and can also be moved tangent thereto by means of rack and pinion control handle 89.

Reference numeral 84 indicates clamps which can be brought to bear against the upper face of the sleeve collar 83 to lock the unit against rotation when desired.

The diamond cutting edge is illuminated by the critically collimated beam of light reflected from table mirror 42 and the shadow image thereof projected along the same axis 74 is sharp edged, free of penumbra and indicates the true shape of the cutting edge.

Since the image of the diamond 90 and grinding wheel 34 are magnified at the same time through the same optical system, the diamond can be set to a given section of the screen template outline 39 with the assurance that it will cut a corresponding contour on the grinding wheel face. Furthermore, since the diamond point is clearly visible it can be set to its optimum cutting position.

With the true edge of the cutting diamond 90 visible on the screen 38, the angle and direction of the wheel dressing cut can be set visually without recourse to gauges, protractors, and other mechanical gadgets, usually required to set the dressing diamond at the desired cutting angle.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. In combination with a grinding machine having a table, a grinding wheel, and work-piece holding and rotating centers positioned on the table in front of the grinding wheel, an optical viewer, comprising, a frame member mounted on the table having a rail portion extending longitudinally of the table and spaced vertically of the work-piece holding and rotating centers; a light-tight housing slidably mounted on the said rail portion; an objective lens system mounted in association with the housing in a dependent position and faced toward the work-piece holding and rotating centers and grinding wheel; the housing having a viewing screen in its front wall and an image projecting system, optically aligned with the objective lens system; a reflecting mirror mounted on the table, below the work-piece holding and rotating centers, in optical alignment with the objective lens system and faced toward the rear of the table; and a light source mounted to the rear of the table in optical alignment with the reflecting mirror, comprising a vertically elongated high intensity gas discharge lamp, a collimator lens, spaced from said lamp, two opaque blades, movable toward and away from each other, positioned between the lamp and the collimator lens, the blades having opposed edges that are tapered away from the blade surface faced toward the lamp so they present two razor thin parallel straight edges faced toward the lamp, and means for varying the distance between the opposed blades to provide critical and collimation of the projected beam in a vertical plane between a point wherein Fresnel diffraction occurs on the viewing screen, and a point whereat the percentage of collimation no longer produces a penumbra-free shadow image on the viewing screen.

2. In combination with a grinding machine having a table, a grinding wheel, and work-piece holding and rotating centers positioned on the table in front of the grinding wheel, an optical viewer and grinding wheel dresser, comprising, a frame member mounted on the table having a rail portion extending longitudinally of the table and spaced vertically of the work-piece holding and rotating centers; a light-tight housing slidably mounted on the said rail portions; an objective lens system mounted in association with the housing in a dependent position and faced toward the work-piece holding and rotating centers and grinding wheel; the housing having a viewing screen in its front wall and an image projecting system, optically aligned with the objective lens system; a reflecting mirror, mounted on the machine table, below the work-piece holding and rotating centers, in optical alignment with the objective lens system and faced toward the rear of the machine table; a light source mounted to the rear of the table in optical alignment with the reflecting mirror, comprising a vertically elongated high intensity gas discharge lamp, a collimator lens, spaced from said lamp, two opaque blades movable toward and away from each other, positioned between the lamp and the collimator lens, the blades having opposed edges that are tapered away from the blade surface faced toward the lamp so they present two razor thin parallel straight edges faced toward the lamp, means for varying the distances between the opposed blades to provide critical collimation of the projected beam; and a bracket mounted on the rail portion, a vertically extending hollow cylindrical sleeve, open to the top and bottom, rotatably mounted on said bracket and positioned so that its center of rotation coincides with the optical axis of the objective lens system; a dependent arm mounted on the sleeve; a tool slide mounted on the lower end of the arm, tangent to the projected circumference of the sleeve, and above the reflecting mirror mounted on the table; means for reciprocating the tool slide in a horizontal plane between adjusted positions; and a wheel dressing diamond mounted on the tool slide with its cutting edge extending into the area defined by the projected circumference of the sleeve, whereby the critically collimated light beam reflected from the reflecting mirror mounted on the table will pass through the sleeve to the objective lens system to form a sharp shadow image of the diamond cutting edge on the viewing screen.

References Cited in the file of this patent
UNITED STATES PATENTS

| | | |
|---|---|---|
| 2,298,992 | Warmisham et al. | Oct. 13, 1942 |
| 2,607,267 | Fultz et al. | Aug. 19, 1952 |
| 3,039,238 | Banko | June 19, 1962 |